United States Patent
Tilove et al.

(10) Patent No.: US 8,170,861 B2
(45) Date of Patent: May 1, 2012

(54) METHOD FOR DISTRIBUTED HYBRID EMULATION OF MANUFACTURING SYSTEMS

(75) Inventors: Robert Bruce Tilove, Rochester Hills, MI (US); Pulak Bandyopadhyay, Bangalore (IN); Stephan R. Biller, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 927 days.

(21) Appl. No.: 12/181,544

(22) Filed: Jul. 29, 2008

(65) Prior Publication Data

US 2010/0030357 A1     Feb. 4, 2010

(51) Int. Cl.
    *G06F 9/455*     (2006.01)
(52) U.S. Cl. .......................... 703/23; 700/99
(58) Field of Classification Search ............ 703/23, 703/24, 25; 700/100, 99
    See application file for complete search history.

(56) References Cited

U.S. PATENT DOCUMENTS 5,195,041 A * 3/1993 George et al. ............. 700/100

OTHER PUBLICATIONS

Vrba, P., Marik, V., 2005. Simulation in agent-based manufacturing control systems. In: Proceedings of the IEEE International Conference on Systems, Man and Cybernetics. pp. 1718-1723.*

* cited by examiner

*Primary Examiner* — Paul Rodriguez
*Assistant Examiner* — Luke Osborne

(57) ABSTRACT

Manufacturing facility process optimization includes monitoring communication signals within a facility device network, analyzing work station specific patterns in the communication signals, developing operational dependencies for work stations based upon the work station specific patterns, and predictively evaluating impacts to the work stations of the proposed configuration of the manufacturing facility process based upon the operational dependencies.

18 Claims, 3 Drawing Sheets

METHOD FOR DISTRIBUTED HYBRID EMULATION OF MANUFACTURING SYSTEMS

TECHNICAL FIELD

This disclosure is related to predictive analysis of a manufacturing facility process.

BACKGROUND

The statements in this section merely provide background information related to the present disclosure and may not constitute prior art.

Modern manufacturing facilities represent a complex assortment of automated, semi-automated, and manual processes working in unison to create an end product. Depending upon the particular end product, manufacturing facilities can include very long manufacturing processes, including thousands of individual work stations, and can even span multiple physical buildings. Implementing and fine-tuning a newly planned manufacturing process on such a manufacturing facility often requires teams of engineers, computer technicians, trades-people, and other staff, and the success of the launch of the new manufacturing plan depends heavily upon a multitude of factors.

Manufacturing engineering ('ME') tools are known in the art to aid on the conceptualization and design of the manufacturing facility. These ME tools reduce planned work stations implementing manufacturing facility processes, such as a robot, a welder, or a manual station, to a list of task descriptions detailing the resources required to perform the required process. These task descriptions frequently include a time based element, and can include other limiting parameters including safety, cost, quality, operating space, power, noise, weight, and other important factors needed to determine an optimal facility configuration. Once all of the necessary information regarding the desired manufacturing processes are entered into the ME tools, simulations may be run and models developed to aid in the planning of the manufacturing process before any equipment is physically located in the manufacturing facility. Such ME tools are known to reduce planning time and costs and to improve development efficiency in the launch process. These ME tools are said to approach the manufacturing facility "from the top down," planning the configuration based on theoretical data, historical data manipulated based upon theoretical effects of certain changes, or comparisons to similar processes in other manufacturing facilities. However, ME tools and related analysis and planning are well known to have limitations based upon the accuracy of the estimations and engineering projections involved.

Thousands of operator stations in a manufacturing process, each possessing degrees of freedom including machinery performance, maintenance, part-in-process variations, and human behavior, must be compensated for in order to keep the manufacturing process running properly. As opposed to ME, operational analysis of manufacturing includes the complex adjustments and refinements necessary to keep the process functioning in spite of variations in the numerous stations. Operational analysis tends to be based upon "bottom up" or data-based analysis, making conclusions based upon tangible outputs, such as the performance of individual work stations and of the process as a whole. However, operational analysis, being primarily a reactive tool to physically present conditions on the manufacturing process, lacks perspective or resources necessary to generate predictive analyses. Repeated study of manufacturing results from an operational sequence consisting of sequential work stations A-B-C-D does not necessarily predict how work stations B-A-D-C would operate. As a result, analyses lend only limited support to validating proposed changes to the manufacturing process.

Changes to manufacturing processes can include refining an existing process and existing equipment, for example by rearranging various work elements or adjusting the flow of manufactured parts through various work stations, or changes can include launching new processes or equipment. Known methods for refining an existing process and existing equipment include simulations of the manufacturing process through ME tools as described above and simple experiential trials dependent largely upon the skills of the personnel involved. Known methods for launching new processes and equipment include expensive and time consuming "ramp-up" trials, occupying the manufacturing facility for a time, precluding actual production, in order to test results and develop action items to be addressed, and solitary equipment trials, with the equipment being run in isolation of a manufacturing context or in conjunction with a simple simulation providing programmed inputs meant to approximate actual inputs.

ME tools and operational analyses approach a similar problem from different viewpoints: ME tools utilize theory and estimation to predict a complex behavior, and operational analyses react to real output data to diagnose physically present conditions. Advantages would be apparent if a method were available to bridge the utility available through theoretical modeling and prediction with the accuracy inherent to data-based diagnostic analysis tied to a manufacturing facility.

SUMMARY

A manufacturing facility process includes a facility device network communicably connected to a plurality of work stations. A method for optimizing the manufacturing facility process includes monitoring communication signals transmitted through the facility device network, and analyzing work station specific patterns in the communication signals. Operational dependencies are developed for the work stations based upon the work station specific patterns, and impacts to the work stations of a proposed configuration of said manufacturing facility process are predictively evaluated based upon the operational dependencies.

BRIEF DESCRIPTION OF THE DRAWINGS

One or more embodiments will now be described, by way of example, with reference to the accompanying drawings, in which.

DETAILED DESCRIPTION

Figure 1:
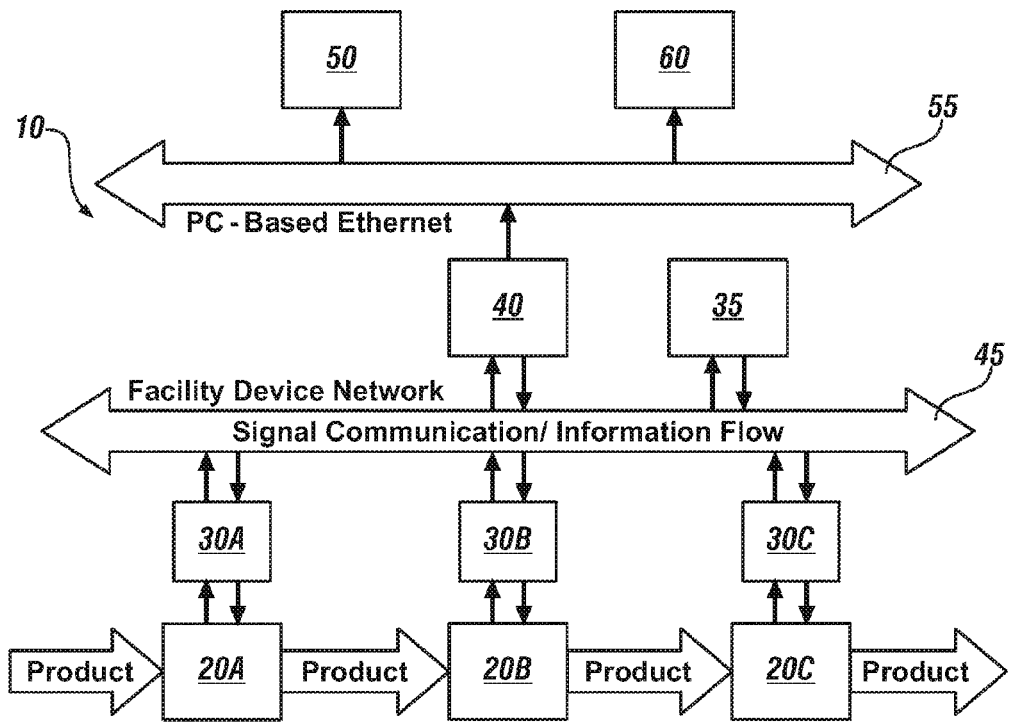
FIG. 1 schematically illustrates an exemplary configuration of a manufacturing facility, in accordance with the present disclosure.

Referring now to the drawings, wherein the showings are for the purpose of illustrating certain exemplary embodiments only and not for the purpose of limiting the same, FIG. 1 schematically illustrates an exemplary configuration of a manufacturing facility in accordance with the present disclosure. Manufacturing facility 10 is depicted comprising work stations 20A, 20B, and 20C, communicably connected to work station controllers 30A, 30B, and 30C, respectively; scheduling, logistics, and control device 35; zone controller 40; facility device network 45; PC-based network 55; and PC stations 50 and 60, wherein PC station 60 includes programming operating to utilize ME tools. Work stations 20A, 20B, and 20C represent sequential elemental areas proximate to or integral with a manufacturing process wherein operations are performed upon a product flow and for the purpose of creating an end product. Work stations can include human operators and automated or semi-automated equipment including robotic devices, conveyors, welding devices, or similar devices known in the art. Individual tasks are assigned to different work stations, and the collective compilation of work tasks can be described as a sequence of operations. Work station controllers 30A, 30B, and 30C are electronic or computerized devices proximate to or integral with the individual work stations providing control, monitoring capability, and other signal connections for the purpose of integrating each work station 20 as part of the overall manufacturing facility 10. For work stations 20 comprising automated or semi-automated equipment, work station controller 30 is known to include a programmable logic controller (PLC), a dedicated digital device designed to interact with the work station 20 and robustly operate in a manufacturing environment. For work stations 20 comprising human operators, work station controller 30 can include electronic interfaces, for example, to provide a safety stop, a visual display monitor to assist the operator, for instance, to aid in the identification of work tasks to be performed, sensors performing physical checks upon the product to catch defective parts, monitoring sensors checking the flow of parts through the station, or other operations known in the art. Work station controllers 30 are communicably connected to facility device network 45. Similar to the above described PLC, facility device network 45 is a dedicated communications network designed for the purpose of communicating signals between various pieces of equipment within the manufacturing facility while robustly operating in a manufacturing environment. Work stations 20 can communicate to each other or to other devices communicably connected to network 45 through the network. It should also be noted that work stations 20 communicate with each other through the environment, for example, by forwarding a product part from one work station to the next or by sensors directly telling one work station positional data about another work station or operation. Also communicably connected to facility device network 45 is zone controller 40, a device which can take many forms and serve a multitude of command and control purposes depending upon the specifics of the manufacturing facility 10. However, zone controller 40 can be capable of providing commands or structure to other devices attached to network 45, monitoring signals from various devices attached to the network and either storing, relaying, or processing that information, and acting as a gateway from the facility device network 45 to other devices connected to a conventional, personal computer (PC) based network 55. Manufacturing facility 10 is known to include other devices communicably attached to facility device network 45. These devices are represented in FIG. 1 by scheduling, logistics, and control device 35. However, it will be appreciated by one having ordinary skill in the art that a multitude of auxiliary devices will be present in a complex manufacturing environment.

Zone controller 40 makes data regarding the operation of manufacturing facility 10 available through a connection to PC-based network 55. This data may be directly fed to plant management, engineering, or other parties, or the data may first be processed to summarize the output results of the manufacturing facility 10. Manipulation and utilization of data available from a manufacturing facility can be performed through methods known in the art, including statistical and other analyses available, for example, as vendor software. The data or resulting analyses may be scrutinized and various operations and processes can thusly be monitored and optimized based upon operational analysis the data. In this way, a complicated manufacturing process can be monitored and variances in the operation of the process can be quickly identified and diagnosed. However, these known methods are limited to operational data analysis, as described above, and any alterations to the manufacturing facility cannot be evaluated based upon the data analysis without interpretation and the application of experience by engineering personnel based upon a series of assumptions.

PC station 50 is depicted communicably connected to PC-based network 55 and includes means to perform the aforementioned operational analysis of historical data. PC station 60 is also communicably connected to PC-based network 55 and is equipped with ME tools, as described above, operable to run simulations predictive of the effects of changes that might be made in the manufacturing facility 10. By being connected to PC-based network 55, statistics from operation data can be used to feed data into the ME tools. While this statistical feed of operation data into the ME tools is useful to the engineer operating station 60 and provides historical performance data for physically embodied configurations of manufacturing facility 10, the data remains limited, isolated to historical performance of individual work stations 20 or subsections of the manufacturing facility 10. Any simulations performed within the ME tools based upon this operation data still requires engineering judgment and significant assumptions to be made regarding interactions of the various components of the manufacturing facility 10. A vast amount of interactional and operational relationships within the facility subject to change with any change to the facility are untracked by the simple operational data collected through known systems.

As described above, ME tools, including simulations and other resources enabling trials of proposed changes to a manufacturing facility, and operational analyses, including historical and statistically-based monitoring of a manufacturing facility, each have advantages as compared to the other in certain aspects of optimizing a manufacturing facility. However, a method combining the advantages of both systems, the flexibility and predictive capabilities of the ME tools with the accuracy and concrete results of operational analysis, would have great advantages to implementing cost and time effective changes in the manufacturing facility. A method is disclosed herein for optimizing a manufacturing facility process including monitoring communication signals within a facility device network, analyzing work station specific patterns in the communication signals, developing operational dependencies for work stations based upon the work station specific patterns, and predictively evaluating impacts to the work stations of the proposed configuration of the manufacturing facility process based upon the operational dependencies.

Figure 2:
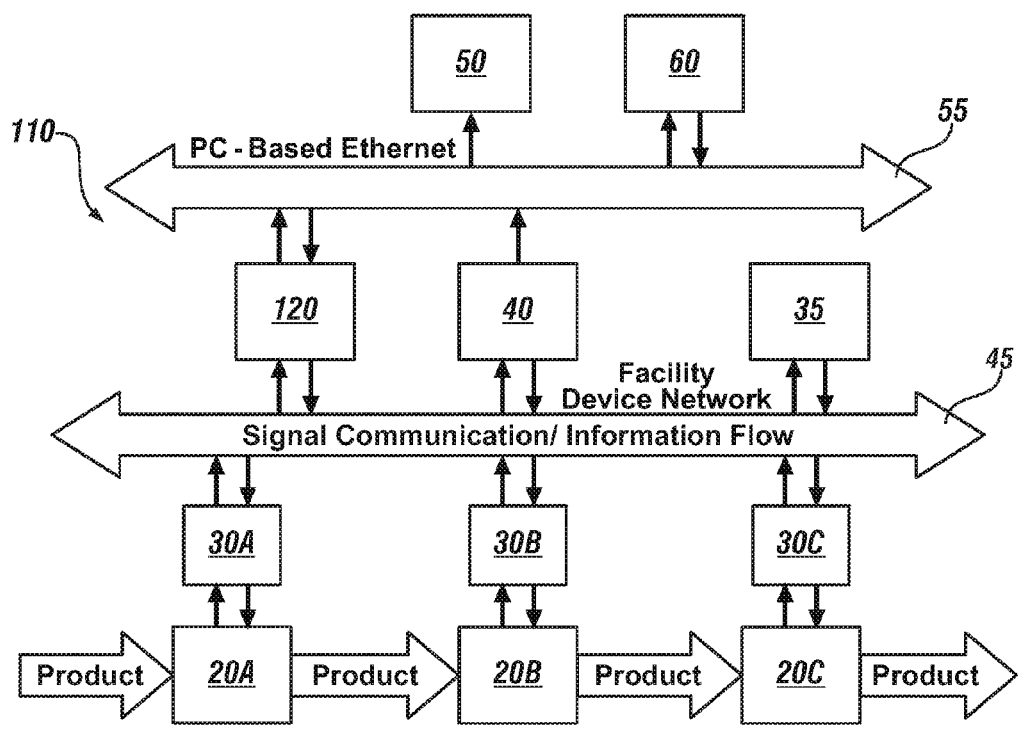
FIG. 2 schematically illustrates an exemplary method, integrating engineering tools with an existing manufacturing facility and an associated facility device network, generating predictive data, in accordance with the present disclosure.

FIG. 2 schematically illustrates an exemplary method, integrating engineering tools with an existing manufacturing facility and an associated facility device network, generating predictive data in accordance with the present disclosure. Manufacturing facility 110 is depicted comprising work stations 20A, 20B, and 20C, communicably connected to work station controllers 30A, 30B, and 30C, respectively; scheduling, logistics, and control device 35; zone controller 40; facility device network 45; PC-based network 55; PC stations 50 and 60, wherein PC station 60 includes programming operating to utilize ME tools; and integration device 120. Integration device 120 in this exemplary embodiment comprises a processor or other electronic module and means to communicate with both facility based network 45 and PC-based network 55. In one exemplary embodiment, integration device 120 is able to translate raw signals between different devices of the manufacturing facility into a data stream capable of being communicated over PC-based network 55. Some exemplary embodiments of integration device 120 also include memory storage and program code for processing data acquired from network 45 into a format compatible for use in station 60. Additionally, programming can be contained within integration device 120 to perform simulations independently based upon interaction with network 45.

Integration device 120 acquires operational data through its connection to facility device network 45. This operational data, accessible through integration device 120, is useful to enable coordination of this data with existing ME tools in station 60 as described above. However, this operational data contains not only the operational data utilized by stations 50 and 60 to perform operational analysis in FIG. 1, but by directly connecting to the facility device network 45, integration device also has an ability to monitor unfiltered commands and signal communication intrinsic to network 45 which would normally be filtered from operational data reaching the PC-based network in FIG. 1. This unfiltered data is likely to include start and stop commands to and from individual work stations 20, sensor readings from a conveyor system moving product between the work stations 20, interaction between work stations controllers 30 and device 35, and other device specific information that is normally not collected. This unfiltered information can be further analyzed for relationships, for instance inferring dependencies and spatial limits of work stations including interactions such as moving products or articulable mechanisms, such as robots or other automated equipment. For example, if one welder never moves past a certain rotational setting until a neighboring robot moves through a certain sequence, a relationship between the two can be queried, either automatically through program code or flagged for engineering inquiry, to improve the simulations run by integration device 120. Groupings of signals that consistently move in unison or with synchronous time delays can be flagged for analysis. In another example, engineers, upon writing a simulation some time after the manufacturing facility is made operational, can check for signal information not thought relevant at the time the facility was set up, but now helpful in a potential rearrangement of work stations. These analyses of data patterns in the operational data can be used in optimization software to flag bottlenecks in process flow, identify operational relationship between work stations, and develop proposed changes in the manufacturing facility based on real data rather than engineering judgment. Additionally, equipment, such as PLC controllers within work station controllers 30 or logistical workstations represented by device 35 can be queried by integration device 120, with programming resident in these controllers or devices written to respond to such queries. In combination with a known proposed change to the manufacturing facility, a subset of work stations likely to be impacted by the proposed change can be analyzed, broken down into component tasks, compared in terms of signal communication and likely signal pattern relationships, and conclusions can be drawn regarding likely impacts of the proposed change. Output of the likely impacts can be deterministic, projecting cycle times or production throughput likely to result; or the output can be probabilistic, with some range of likely values identified and likely factors to impact the range identified. Access to facility device network 45 and the signal communication contained therein enables integration device 120 to perform detailed simulations based upon actual signal flow and the operation characteristics of the manufacturing facility, wherein results of the simulations include extensively more factual relationships that previously available through monitoring output of zone controller 40.

Manufacturing facility 110 configured as depicted within FIG. 2 can perform a multitude of virtual launch simulations, providing analytical results for work station configurations not yet capable of producing actual results. For instance, data gained through integration device 120 can be utilized to simulate equipment already present within the manufacturing facility but not yet configured according to the layout intended to be tested. Work stations can include large expensive pieces of equipment not easily moved. Analysis of signals made available through direct connection to the facility device network 45 and simulated trials of rearranged pieces of equipment through the results of this analysis can be used to validate the high costs and efforts involved in moving and reconfiguring the equipment. Work stations with human operators can include factors such as physiology and sociology which can be modeled through analysis made possible by integration device 120. For instance, delays and cycle overruns within a series of operator work stations can be analyzed for individual operations within the operator tasks and patterns can be analyzed. For instance, if an operator's signal patterns show a pause in correlation to a particular device nearby the operator work station, a flag can be identified to engineering to investigate, for instance, whether the device somehow causes the pause. In another example, if an operator completes all operations at the work station, but shows a pattern of pausing to advance the part, a flag can be identified to engineering to investigate the behavior. A multitude of analyses are possible utilizing data made available through integration device 120. Although exemplary embodiments are described above, the disclosure is not intended to be limited thereto.

Figure 3:
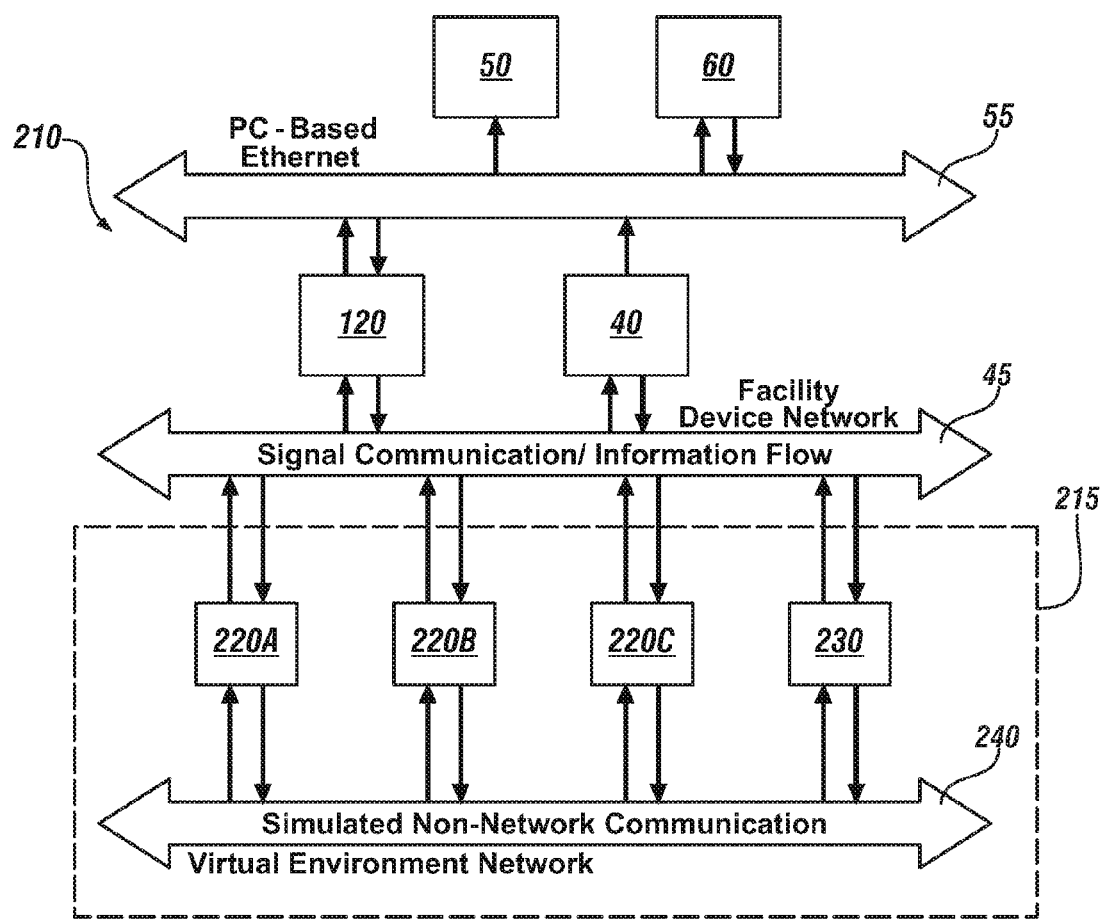
FIG. 3 schematically illustrates another exemplary method to utilize an existing manufacturing facility network to generate predictive data, in this embodiment, by utilizing emulation modules simulating results from manufacturing work stations in order to perform virtual launch and validation trials, in accordance with the disclosure.

FIG. 3 schematically illustrates another exemplary method to utilize an existing manufacturing facility network to generate predictive data, in this embodiment, by utilizing emulation modules simulating results from manufacturing work stations in order to perform virtual launch and validation trials, in accordance with the disclosure. Manufacturing facility 210 is depicted comprising work stations 20A, 20B, and 20C, communicably connected to work station controllers 30A, 30B, and 30C, respectively; zone controller 40; facility device network 45; PC-based network 55; PC stations 50 and 60, wherein PC station 60 includes programming operating to utilize ME tools; integration device 120; and a simulated manufacturing environment 215. As mentioned above, ME tools are frequently used to develop a launch plan for new equipment or processes in a manufacturing facility. Known methods involve engineers developing estimated values for the properties and behaviors of a particular operation and inputting these values into the ME tool. FIG. 3 demonstrates a method whereby simulated manufacturing environment 215 comprising emulation modules 220A, 220B, and 220C can be utilized within manufacturing facility 210 to simulate the behaviors of particular work stations and work station controllers in conjunction with an existing facility device network 45 to simulate the behaviors of stations not yet physically available or not yet configured to be so operated. Additionally, emulated scheduling, logistics, and control device 230 is depicted, illustrating an emulation module utilized to simulate device 35 depicted and described in association with FIG. 1. Alternatively, device 35 from the existing manufacturing facility can be used if configured to participate in simulations as illustrated in FIG. 3. Emulation modules 220 and device 230 can operate independently, running simulations of individual or groups of work stations and devices within manufacturing facility 210, operating primarily on the basis of inputs received from facility device network 45. However, as noted above, work stations 20 within manufacturing facility 10, as depicted in FIG. 1, also communication through the environment. Virtual environment network 240 is depicted in FIG. 3, communicably connected to emulation modules 220 and device 230, simulating environmental conditions and methods of communications not utilizing facility device network 45 between the various emulation modules 220 and device 230. In this way, simulated manufacturing environment 215 can utilize a plurality of emulators and other simulating devices to model operation of a manufacturing facility within the context of an existing manufacturing device network.

Manufacturing facility 210 configured as depicted within FIG. 3 can perform a multitude of virtual launch simulations, providing analytical results for work station configurations not yet available or capable of producing actual results. For instance, emulation modules 220 as depicted in FIG. 3 can be assembled to test a manufacturing process still only existing as a plan. Software, for example on a laptop computer, can be utilized at the site of the manufacturer of a particular piece of equipment to track the behavior of an exemplary test station acting upon an exemplary test part months before the actual piece of equipment is due to be delivered to the manufacturing facility. The software can then be used to simulate the behavior of the piece of equipment by producing a data stream similar to what the eventual piece of equipment will produce later as part of the manufacturing process. Similar trials can be run at different manufacturers, and the trials can be compiled together to assemble a set of emulation modules 220 capable of modeling various work stations of manufacturing facility 210. Additionally, emulation modules operating in tandem with a virtual environment network 240 can be used to simulate changes outside of the emulated work stations, for example, changes in the manufactured product can be programmed into the virtual environment network and analytically tested. Through the configurations described above, not only can the behavior of individual work stations be simulated, but the interaction and interdependence of various work stations and the environment in which they operate can be modeled and simulated. For instance, spatial operation of a series of robots within planned work stations can be emulated. Based upon trials of the individual robots and sampling of planned robot command codes, planned incremental movements of each robot can be analyzed, and operation of the plurality of robots within a single area can be planned and validated, for example, saving floor space within the manufacturing facility and allowing multiple work tasks in parallel on a single product part. Used thusly, a simulated manufacturing environment can be used in a manufacturing facility environment to emulate pieces of equipment not yet available, allowing development in terms of trials and simulations which cannot be run in succession after the expensive equipment has actually been installed and reducing development time and costs currently associated with waiting for the various pieces of equipment for the manufacturing facility to be delivered.

Figure 4:
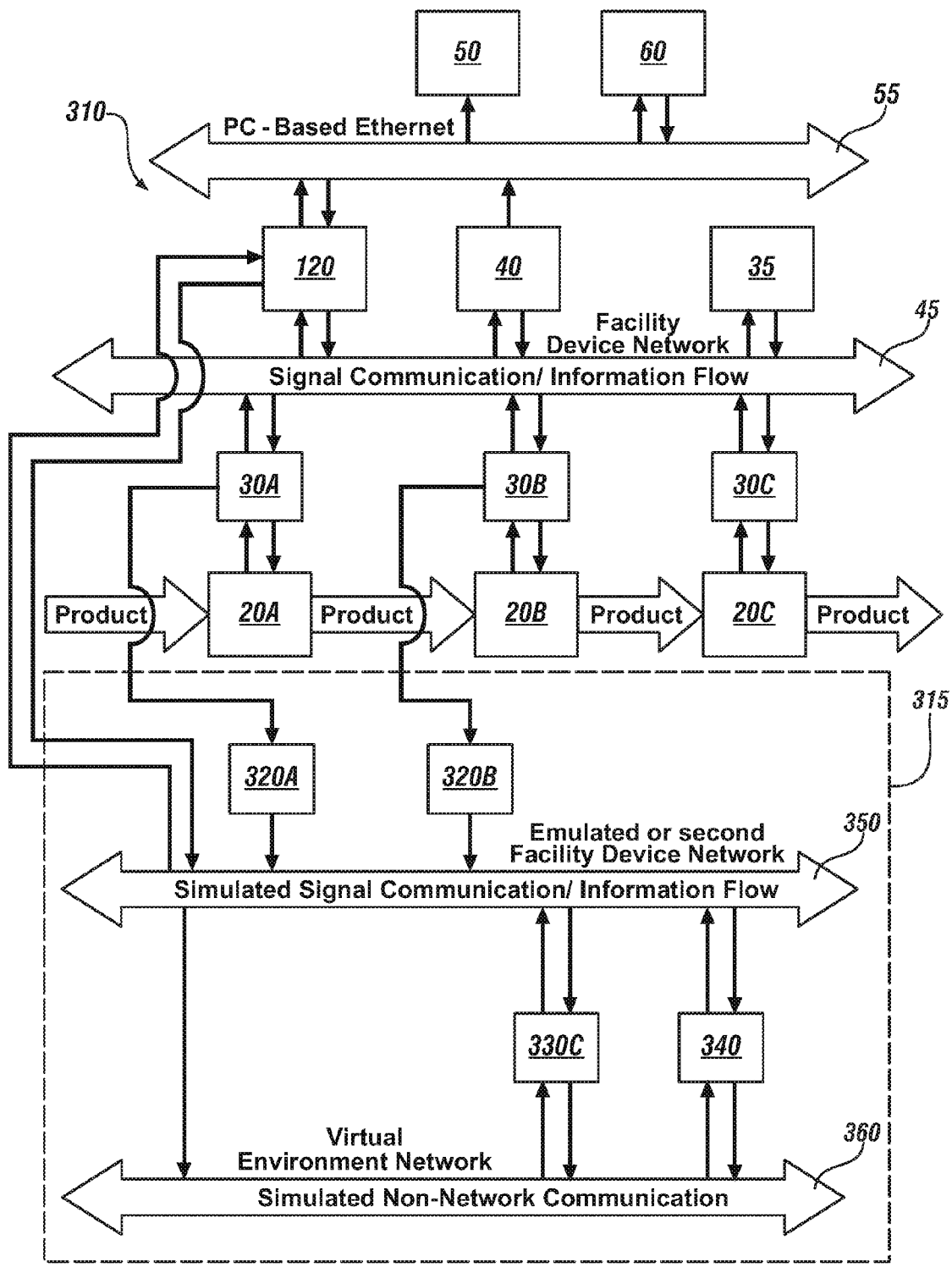
FIG. 4 schematically illustrates an additional exemplary method to implement ME tools, emulation modules, and other simulated manufacturing tools in conjunction with an operational manufacturing facility in order to generate predictive analysis of the facility, in accordance with the disclosure.

Fine tuning operation of a manufacturing facility is an important task during an initial launch of a configuration within the facility. However, manufacturing facilities require processes known as continuous improvement and cost reduction to remain competitive. As a result, considerable effort is expended within an existing manufacturing facility to refine the work flow and remove inefficiencies from the process. FIG. 4 schematically illustrates an additional exemplary method to implement ME tools, emulation modules, and other simulated manufacturing tools in conjunction with an operational manufacturing facility in order to generate predictive analysis of the facility, in accordance with the disclosure. Manufacturing facility 310 is depicted comprising work stations 20A, 20B, and 20C, communicably connected to work station controllers 30A, 30B, and 30C, respectively; scheduling, logistics, and control device 35; zone controller 40; facility device network 45; PC-based network 55; PC stations 50 and 60, wherein PC station 60 includes programming operating to utilize ME tools; integration device 120; and a virtual manufacturing facility 315. As described above, ME tools with their associated predictive functionality can be utilized in conjunction with historical manufacturing operations data with the associated accuracy and diagnostic functions to monitor and optimize a manufacturing process. Further, as described above, emulation modules may be used to simulate particular work stations and, in conjunction with an existing facility device network, accurately predict how various pieces of equipment not yet available will operate. Additionally, as described above, a virtual environment network can be created to simulate non-network forms of communication, thereby improving simulation of the operation of other devices and work stations within the facility. FIG. 4 demonstrates an embodiment wherein the above methods and devices may be used to facilitate replacing equipment and reorganizing an existing and ongoing process manufacturing facility 310 by operating therewithin a virtual manufacturing facility 315. Exemplary virtual manufacturing facility 315 comprises log file devices 320A and 320B, containing historical data regarding the operation of work stations 20A and 20B, respectively; emulation module 330C; emulated scheduling, logistics, and control device 340; emulated or second facility device network 350; and virtual environment network 360. In comparison, the embodiments of FIGS. 2 and 3 both depend upon an existing facility device network 45 to gather data and improve accuracy of predictions by analyzing details within the communication patterns of an existing network. The embodiment of FIG. 2 is described to observe and non-interferingly interact with operational work stations and devices in order to promote a more predictive understanding of the operation of those work stations and devices. The embodiment of FIG. 3 utilizes a non-operational or not in service facility device network connected to emulation modules to trial and validate simulations of how new or modified equipment and facility configurations will operate and perform. The embodiment of FIG. 4 includes a dedicated emulated or second facility device network 350 in parallel to an operational facility device network 45, in order to facilitate a combination of on-going operational data analysis and emulation of new or modified work stations and devices, the emulated or second facility device network 350 allowing accurate analysis of simulated operation without interfering with on-going operations of the existing process. Emulated or second facility device network 350 can comprise either a physical clone or representative copy of the facility device network 45 existing within the manufacturing facility 310, or network 350 can comprise an emulated simulation of facility device network 45. Emulated or second facility device network 350 can be programmed, attenuated, trained, or otherwise fine-tuned to closely approximate signal operation of facility device network 45. This approximation can be performed once as an initial setup function, or, preferably, the approximation can be updated either manually or automatically to operational characteristics of facility device network 45 based upon current conditions. Additionally, use of emulated or second facility device network 350 can include the simulation of particular facility scenarios, wherein trials can be run, for example, to test the impact of a particular maintenance failure in the network or the impact of a particular stock part running out. In this way, an operational manufacturing facility can accurately and predictively analyze the impacts particular revisions or changes to the overall process without incurring the costs and delays associated with interrupting on-going operation of the facility.

As will be appreciated by one having ordinary skill in the art, computerized simulations of a complex process can vary in processing requirements. Modern computers are capable of billions of calculations per second, and simplistic simulations may take place in an instant. In such a case, a simulation conducting a trial of a thousand operational cycles taking over a minute a piece in the physical facility may not be desired to be tied to the physical facility. Instead, the log file device described above can be used to feed output data from a sample run of the physical work station without forcing the simulation to wait for the actual sample run. In other simulations requiring complex interactional comparisons of millions of signals from within a complex manufacturing facility, simulations can take longer than actual cycle times of the equipment. As described above, the log file module can be used to feed output data from a sample run of the physical work station at a data rate in accordance with the simulation. The embodiment of FIG. 4, described above, is especially useful in that it can utilize real-time data recorded in the log file modules without delaying cycle times in the still-operational physical work stations.

The above embodiments describe improvements made within a manufacturing facility. However, it will be appreciated by one having ordinary skill in the art that modern communications with wireless devices or over the internet allow communications in various forms and over great distances. The improvements mentioned herein are contemplated for implementation within a single physical manufacturing structure or in multiple and remote locations. For instance, a robot manufacturer can offer with the purchase of the robot emulation support from their remote engineering office and include means at the customer manufacturing site to integrate and communicate with the existing facility device network for purposes of validating planned use of the robot. Alternatively, a manufacturer with multiple manufacturing facilities can chose to create an infrastructure center to communicate with, monitor, and emulate multiple facility device networks around the world from a single location, thereby allowing single point support of the emulations and centralized planning of manufacturing refinements. Operated thusly, it is also contemplated that multiple emulated or auxiliary facility device networks can be created for a single operational facility device network, allowing different functional units within a corporation owning the manufacturing facility to improve the manufacturing process in parallel. In such a configuration utilizing multiple emulated or auxiliary facility device networks, the separate networks can operate independently, be each slaved to the operational facility device network, be each slaved to a primary master engineering emulated or auxiliary facility device network, or thusly operated in some combination of dependency. Many embodiments of utilizing communicative means to utilize the above methods in a plurality of locations are envisioned, and the disclosure is not intended to be limited to the particular exemplary embodiments described herein.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for optimizing a manufacturing facility process comprising a facility device network communicably connected to a plurality of work stations, said method comprising:
    monitoring communication signals transmitted through said facility device network connecting the plurality of work stations;
    analyzing work station specific patterns in said communication signals for signal pattern relationships;
    developing operational dependencies detailing interdependent relationships between said work stations based upon said work station specific patterns; and
    predictively evaluating impacts to said work stations of a proposed configuration of said manufacturing facility process based upon said operational dependencies.

2. The method of claim 1, wherein said monitoring communication signals includes connecting an integration device to said facility device network, said integration device configured for interpreting said communication signals into a data stream and outputting said data stream in a format readily accessible through computing devices.

3. The method of claim 2, wherein outputting said data stream in a format readily accessible through computing devices includes manipulation of said communication signals into configurable work station specific terms including at least one of work station cycle times, time spans between different signal events in a work station specific cycle, and correlation between a signal event in a work station specific cycle and a signal event in different work station specific cycle.

4. The method of claim 2, wherein outputting said data stream in a format readily accessible through computing devices includes geometric relationships between articulable mechanisms within a plurality of said work stations.

5. The method of claim 1, further comprising replacing one of said plurality of work stations with an emulation module configured to simulate work station specific outputs programmed based upon said proposed configuration.

6. The method of claim 5, further comprising utilizing a log file module communicably connected to said facility device network containing historical operational data from one of said plurality of work stations to enable simulation of manufacturing facility process at speeds different from a normal operational speed.

7. The method of claim 5, wherein replacing one of said plurality of work stations with said emulation module further comprises utilizing a virtual environment network simulating non-network environmental communications between said work stations.

8. The method of claim 5, further comprising utilizing an emulated facility device network communicably connected to said emulation module, programmed to simulate signal communications normally transmitted through said facility device network, and operating in parallel to said facility device network.

9. The method of claim 8, wherein said replacing one of said plurality of work stations with said emulation module further comprises utilizing a virtual environment network simulating non-network environmental communications between said work stations.

10. The method of claim 5, further comprising utilizing a second facility device network communicably connected to said emulation module, configured to simulate signal communications normally transmitted through said facility device network, and operating in parallel to said facility device network.

11. The method of claim 10, wherein replacing one of said plurality of work stations with said emulation module further comprises utilizing a virtual environment network simulating non-network environmental communications between said work stations.

12. Method for validating a proposed change to a manufacturing facility process comprising a facility device network communicably connected to a plurality of work stations, said method comprising:
    identifying a subset of said plurality of work stations potentially impacted by said proposed change to said manufacturing facility process;
    replacing a work station within said subset with an emulation module comprising processing capable of simulating work station specific outputs programmed based upon said proposed change;
    monitoring communication signals transmitted through said facility device network connecting the plurality of work stations;
    analyzing work station specific patterns in said communication signals for signal pattern relationships;
    developing operational dependencies detailing interdependent relationships between each of said plurality of work stations based upon said work station specific patterns; and
    predictively evaluating impacts to said subset of said proposed change to said manufacturing facility process based upon said operational dependencies.

13. The method of claim 12, wherein said predictively evaluating impacts to said subset of said proposed change to said manufacturing facility process comprises outputting a deterministic projected performance of said plurality of work stations.

14. The method of claim 12, wherein said predictively evaluating impacts to said subset of said proposed change to said manufacturing facility process comprises outputting a probabilistic projected performance of said plurality of work stations.

15. The method of claim 14, wherein said outputting said probabilistic projected performance of said plurality of work stations includes identifying likely simulated sources of variation in said probabilistic projected performance of said plurality of work stations.

16. System for optimizing a manufacturing facility process comprising a plurality of work stations through a new process launch, said manufacturing facility process comprising a facility device network communicably connected to an emulation module and the plurality of work stations, said system comprising:
    said emulation module programmed to simulate a work station output comprising simulated communications signals over said facility device network in accordance with said new process launch;
    a computerized processor programmed with a manufacturing engineering tool configured for analyzing data from said manufacturing facility process and outputting a predictive analysis of said new process launch, said data comprising said simulated communication signals and said predictive analysis comprising analyzing work station specific patterns in said signals for signal pattern relationships and developing operational dependencies detailing interdependent relationships between said work stations based upon said work station specific patterns; and
    an integration device communicably connected to said facility device network connecting the plurality of work stations and said computerized processor and translating signal communications from said facility device network into a data stream readable by said computerized processor.

17. The system of claim 16, further comprising a log file device communicably connected to said facility device network and outputting historical operational data from one of the plurality of work stations.

18. The system of claim 16, further comprising a virtual environment network communicably connected to said emulation module and simulating non-network environmental communication between the plurality of work stations.

* * * * *